United States Patent
Kropp

[19]

[11] Patent Number: 6,097,864

[45] Date of Patent: Aug. 1, 2000

[54] BRANCHING OPTICAL WAVE GUIDE CONFIGURATION

[75] Inventor: Jörg-Reinhardt Kropp, Berlin, Germany

[73] Assignee: Siemens Aktiengesellschaft, Munich, Germany

[21] Appl. No.: 09/035,387

[22] Filed: Mar. 5, 1998

[30] Foreign Application Priority Data

Mar. 5, 1997 [DE] Germany .......................... 197 11 121

[51] Int. Cl.[7] .................................................. G02B 6/26
[52] U.S. Cl. ................................ 385/44; 385/14; 385/31; 385/47; 385/130; 385/131; 385/49
[58] Field of Search ................................ 385/14, 15, 31, 385/36, 44, 47, 131, 129, 130, 49

[56] References Cited

U.S. PATENT DOCUMENTS

| | | | |
|---|---|---|---|
| 3,901,582 | 8/1975 | Milton | 385/44 X |
| 4,173,390 | 11/1979 | Kach | 385/44 X |
| 4,346,961 | 8/1982 | Porter | 385/44 X |
| 5,222,163 | 6/1993 | Handa et al. | 385/14 |
| 5,369,719 | 11/1994 | Mishima et al. | 385/48 |
| 5,400,419 | 3/1995 | Heinen | 385/14 |
| 5,757,994 | 5/1998 | Schoenwald et al. | 385/44 |
| 5,898,803 | 4/1999 | Mueller-Fiedler | 385/36 |

FOREIGN PATENT DOCUMENTS

| | | | |
|---|---|---|---|
| 92/11553 | 7/1992 | WIPO | 385/14 X |
| 96/07117 | 3/1996 | WIPO | 385/14 X |

OTHER PUBLICATIONS

"Distribution of Light Power and Optical Signals Using Embedded Mirrors Inside Polymer Optical Fibers", Yao Li et al., IEEE Photonics Technology Letters, vol. 8, No. 10, Oct. 1996, pp. 1352–1354.

"4×6 Polymer Fiber Optical Array Couplers", Yao Li et al., IEEE Photonics Technology Letters, vol. 8, No. 12, Dec. 1996, pp. 1650–1652.

*Primary Examiner*—Brian Healy
*Attorney, Agent, or Firm*—Herbert L. Lerner; Laurence A. Greenberg; Werner H. Stemer

[57] ABSTRACT

One or more continuous optical wave guides are disposed on a substrate. A partial light transfer is effected by a reflective face which deflects the light out of the continuous optical wave guide and into a branching optical wave guide disposed at an angle to it, or vice versa. To that end, a protrusion is formed on the substrate, which at least partially penetrates into the jacket face of the optical wave guide and which defines the reflective face within the cross section of the optical wave guide core.

8 Claims, 4 Drawing Sheets

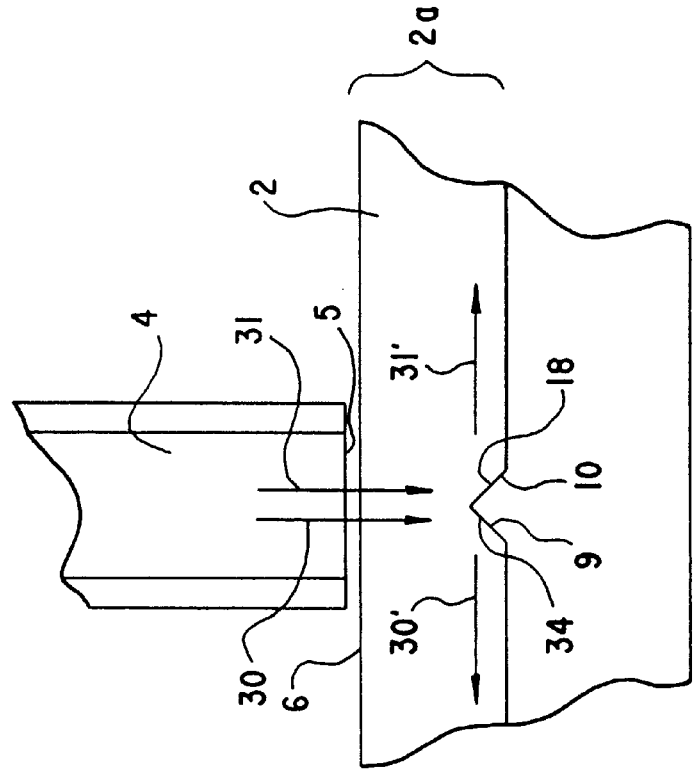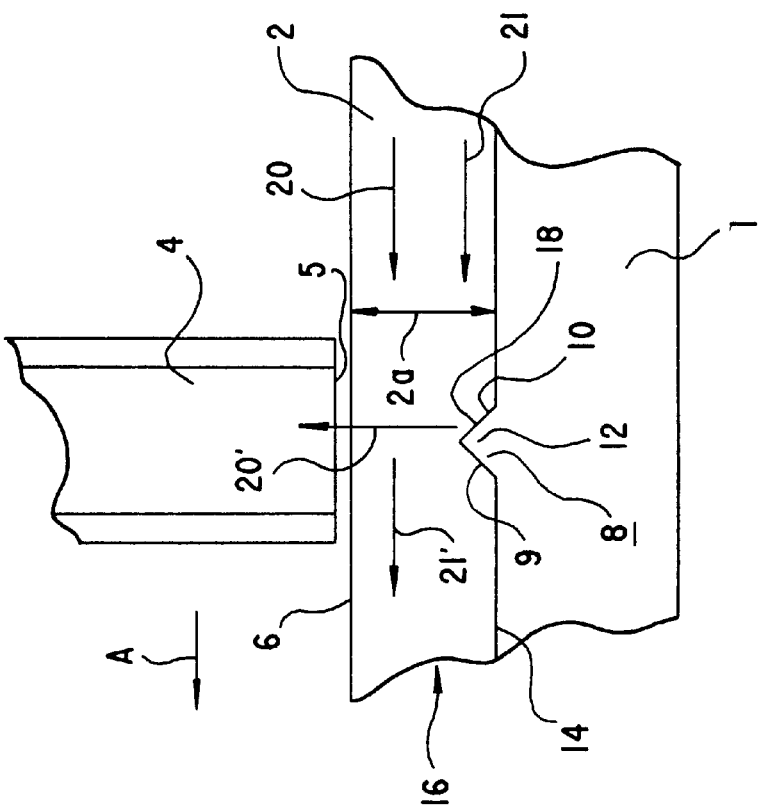

BRANCHING OPTICAL WAVE GUIDE CONFIGURATION

BACKGROUND OF THE INVENTION

Field of the Invention

The invention relates to the field of optical signal and data transmission, especially in multiprocessor systems, for which increased use of so-called optical bus systems may be expected in the forseeable future. In principle, a data bus is understood to mean the use of one common signal path by a plurality of participants. To that end, the signal path has branches for signal output and/or signal input. This is no problem in electrical signal lines or bus systems, because of the electrical conductor properties. However, optical wave guide branching—especially in data transmission systems with a large number of parallel data lines—is a demanding technological problem.

The invention pertains to a branching optical wave guide configuration, having at least one continuous optical wave guide. The latter has a light-guiding core which is disposed on a substrate. At least one branching optical wave guide is disposed at an angle to the continuous optical wave guide and its coupling end face faces toward the continuous optical wave guide. At least one reflective face effects a light transfer between the continuous optical wave guide and the branching optical wave guide. Similarly, the invention also relates to a branching optical wave guide array. The term light-guiding core in the context of the present invention is understood to mean the core region, used for optical wave guidance, of an optical wave guide. In practical embodiment, various combinations of materials for the core and the cladding jacket are possible. Due to the different indices of refraction, the materials bring about light guidance. The jacket may for instance be formed of a separate material with a lower index of refraction, but may also be formed by the substrate or at exposed faces by the ambient air.

An optical wave guide configuration of this generic type is known in principle from the paper entitled "4×16 Polymer Fiber Optical Array Couplers" by Yao Li, Ting Wang and K. Fasanella in 8 *IEEE PHOTONICS TECHNOLOGY LETTERS* No. 12, Dec. 1996. That prior art optical wave guide configuration is a 4×16 beam splitter, using polymer optical fibers (POFs) with four continuous optical wave guides. Each of the continuous optical wave guides is defined by a defined removal of material such that in each case some of the light guided in it is transferred into one or all of the four branching optical wave guides each assigned to it. Specifically, the prior art wave guide configuration has three plastic plates for this purpose. The total of 16 branching optical wave guides are fixed in through bores of a base plate. The surface of the base plate is formed with four grooves for receiving the four continuous optical wave guides that are at right angles to the branching optical wave guides. The coupling end faces of the branching optical wave guides are each in partial-surface contact with the jacket face of the respective continuous optical wave guides assigned to them. An upper plate likewise has four grooves for fixing the continuous optical wave guides and also has 16 larger through bores, through which cutting blades can be placed in contact with the continuous optical wave guides. The continuous optical wave guides are fixed between the base plate and the upper plate by screw forces and are cut in at an angle of 45° from their jacket face with the aid of a cutting tool delivered through the through bores. Next, by one further cut each, an approximately cylindrical hoof shaped region is cut out of the optical wave guide material. The cut face oriented obliquely to the longitudinal axis of the optical wave guide forms a reflective face.

That prior art optical wave guide configuration requires not only many individual parts that must be finished and mounted separately but also highly precise cutouts of material from the continuous optical wave guides. Producing such an optical wave guide configuration is therefore very complicated and expensive, and because the orientation and quality of the reflective faces depends on the course of the cuts, optimal optical properties cannot always be guaranteed. Moreover, the packing density and the division in the continuous optical wave guides are structurally restricted.

SUMMARY OF THE INVENTION

It is accordingly an object of the invention to provide a branching optical wave guide configuration, which overcomes the above-mentioned disadvantages of the heretofore-known devices and methods of this general type and which permits very economical, simple manufacture even if there are many continuous optical wave guides disposed closely adjacent one another.

With the foregoing and other objects in view there is provided, in accordance with the invention, a branching optical wave guide configuration, comprising:

a substrate having a protrusion formed thereon;

a continuous optical wave guide with a light-guiding core disposed on the substrate;

a branching optical wave guide having a coupling end face disposed in a vicinity of and facing towards the continuous optical wave guide, the branching optical wave guide extending at an angle (e.g. 90°) relative to the continuous optical wave guide;

the protrusion projecting into the light-guiding core of the continuous optical wave guide and defining at least one reflective face effecting a light transfer between the continuous optical wave guide and the branching optical wave guide.

In other words, the objects of the invention are satisfied by the protrusion on the substrate which penetrates at least partway into the light-guiding core of the continuous optical wave guide. The protrusion has at least one face, located in the cross section of the light-guiding core, that forms the reflective face.

In the optical wave guide configuration of the invention, the core cross section of the continuous optical wave guide is narrowed on one side by means of a preferably prismatic deformation of the lateral optical wave guide boundary. The face of the protrusion protruding into the optical wave guide core cross section and penetrating the optical wave guide jacket face from the outside into the bore acts as a mirror, so that some of the light guided in the core region would exit approximately perpendicularly through the optical wave guide jacket face, for instance. If the angle of the reflective face relative to the optical wave guide is selected such that on the basis of the index of refraction of the optical wave guide and its surroundings total reflection occurs, then a separate mirror-coating of the face can be dispensed with. A portion of light exiting from the jacket of the continuous optical wave guide passes via the coupling end face oriented toward it into the branching optical wave guide and would be carried onward by it. Conversely and correspondingly, a transfer of light signals—which exit from the coupling end face of the branching optical wave guide and pass through the jacket region into the continuous optical wave guide and reach the reflective face—and hence a feeding of light signals into the continuous optical wave guide is possible. The proportion of the transferred light can be adjusted by means of the magnitude and shaping of the deformation or the prismatic protrusion.

A substantial advantage of the optical wave guide configuration of the invention is that the reflective face is formed by the protrusion on the substrate. Complicated individual machining and changing of the shape of the continuous optical wave guides to form reflective faces is thus unnecessary. The protrusions may be formed on the substrate by means of technologically easily manipulated production processes, such as methods for planar structuring or swaging techniques. The substrate with the protrusions can advantageously be formed spatially separate and prior to introducing and mounting the optical wave guides. A danger of damage to the highly sensitive optical wave guides is safely averted. A further considerable advantage of the configuration of the invention is that it makes do with a comparatively small number of individual parts that have to be produced and manipulated.

In accordance with an added feature of the invention, the continuous optical wave guide extends along a given direction, and wherein the protrusion has a prismatic cross section with two side faces extending transversely to the given direction of the continuous optical wave guide, the two side faces being inclined towards one another and each defining a reflective face of the protrusion. This embodiment is especially advantageous if the continuous optical wave guide, or an optical bus line formed by it, is to be used bidirectionally.

In accordance with an additional feature of the invention, the branching optical wave guide is one of two mutually parallel branching optical wave guides, and wherein the continuous optical wave guide extends along a given direction, the protrusion having a trapezoidal cross section with two side faces which are inclined towards one another and a plateau formed between the side faces, the two side faces extending transversely to the given direction of the continuous optical wave guide and each of the side faces being aligned with a respective one of the branching optical wave guides. In this embodiment of the invention, suitable for instance for unidirectional branching optical wave guides, defined extraction or input points for light signals are created. The length (width) of the plateau enables an adequate spacing between the branching optical wave guides which are spaced apart in accordance with the plateau length.

With the above and other objects in view there is also provided, in accordance with the invention, a branching optical wave guide array, comprising:

a substrate formed with at least one protrusion;

a plurality of continuous optical wave guides, each formed with one light-guiding core, disposed on the substrate;

a plurality of branching optical wave guides extending at an angle relative to the continuous optical wave guides, each of the branching optical wave guides being formed with a respective coupling end face facing toward the continuous optical wave guides;

the protrusion penetrating into the light-guiding cores of the continuous optical wave guides, and being formed with at least one face within a cross section of the cores defining a reflective face in each of the continuous optical wave guides effecting a light signal transfer between the continuous optical wave guides and respective branching optical wave guides.

The principle on which the invention is based is most advantageously employed in a branching optical wave guide array with a plurality of continuous optical wave guides, each with one light-guiding core. The wave guides are preferably disposed on a single substrate. A plurality of branching optical wave guides extend at an angle (different from parallel) to the continuous optical wave guides and the coupling end faces of the branching wave guides face towards the continuous optical wave guides. Here, at least one protrusion is provided on the substrate and the protrusion penetrates from the jacket side partway into the light-guiding cores of the continuous optical wave guides. The single protrusion element form a reflective face in each of the cross sections of the cores.

Here a substantial advantage of the configuration according to the invention comes into play, which is that an optical data bus with many closely adjacent, continuous optical wave guides may be formed on a single substrate. The branching optical wave guides are advantageously disposed substantially perpendicular to the substrate surface in the form of an optical wave guide array with a matrix spacing equivalent to the lateral pitch of the continuous optical wave guides. Especially preferably, the array of branching optical wave guides may have an optical array plug. In this way, many branches can be realized in the tightest possible space.

In accordance with another feature of the invention, means are provided on the substrate and on the branching optical wave guides for exactly positioning the branching optical wave guides relative to the reflective faces. This allows proper and failsafe alignment of the ends of branching optical wave guides in an especially simple and precise way.

In accordance with a concomitant feature of the invention, the substrate is a plastic substrate. This element is especially advantageous from the standpoint of production and economy.

Other features which are considered as characteristic for the invention are set forth in the appended claims.

Although the invention is illustrated and described herein as embodied in a branching optical wave guide configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a partial, sectional, diagrammatic view of a detail of a first embodiment of an optical wave guide configuration according to the invention;

FIG. 2 is a similar view of a further detail thereof;

DESCRIPTION OF THE PREFERRED EMBODIMENTS

Figure 3:
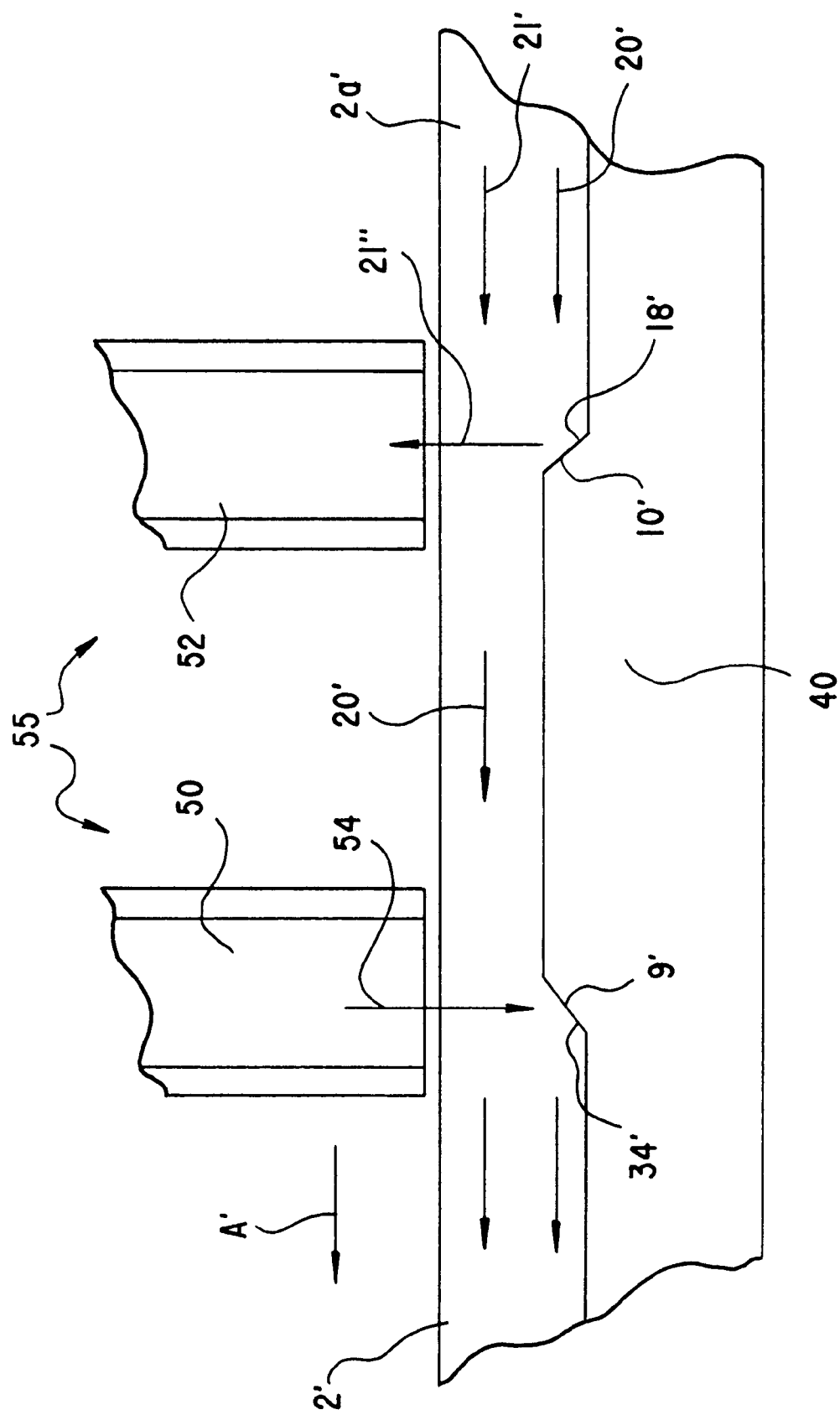
FIG. 3 is a similar view of a detail of a second embodiment of the optical wave guide configuration according to the invention.

Referring now to the figures of the drawing in detail and first, particularly, to FIG. 1 thereof, there is seen a substrate 1, on which there is disposed a continuous optical wave guide 2 with a light-guiding core 2a. A branching optical wave guide 4 is disposed orthogonally to the continuous optical wave guide 2. A coupling end face 5 of the wave guide 4 faces toward a cladding jacket 6 of the optical wave guide 2. A protrusion 8 is formed on the substrate 1. Side faces 9, 10 extend substantially transversely or perpendicular to a longitude A of the continuous optical wave guide 2. The protrusion 8 has a cross section with a triangular prismatic base shape 12. The protrusion 8 penetrates (projects into) the optical wave guide 2 from the jacket side 14 and with its side face 10 located in the cross section 16—i.e., in the cross-sectional projection—of the optical wave guide core 2a, it forms a reflective face 18.

Optical signals, shown schematically as arrows 20, 21, in the core 2a of the continuous optical wave guide 2 are transmitted in the direction of the arrow A. One component 20' of the light signals is deflected by the reflective face 18 onto the coupling end face 5 of the branching optical wave guide 4. By this, a partial light signal transfer to the branching optical wave guide 4 is brought about. The remaining component 21' passes through the region of the protrusion 8 unaffected and is carried onward in the core 2a.

Reference is now had to FIG. 2, which shows the structural layout already described in conjunction with FIG. 1. Here, a light signal transfer is shown from the branching optical wave guide 4 into the core 2a of the continuous optical wave guide 2. Optical signals 30, 31 extending in the branching optical wave guide and exiting at the coupling end face 5 pass (as indicated by arrows) through the jacket face 6 on the outside of the optical wave guide 2 into the optical wave guide 2 and are fed, via the side faces 9, 10 acting as reflective faces 18, 34, into the core 2a in opposite directions represented by arrows 30', 31'.

FIG. 3 shows a variant of the optical wave guide configuration according to the invention. There, the prismatic protrusion 8' has a plateau region 40 between its side faces 9', 10'. As a result, the side faces 9', 10' acting as reflective faces 18', 34' are spaced apart in such a way that an incoming branching optical wave guide 50 and an outgoing branching optical wave guide 52 may be disposed entirely separately from one another and without crosstalk. Signals 20', 21' propagated in the core 2a' of the continuous optical wave guide 2' are transferred partially (signal component 21") into the optical wave guide 52, while the remaining component 20' is carried onward along the core 2a'. Light signals 54 enter from the branching optical wave guide 50 and are fed in the signal direction A' via the reflective face 34' at the coupling point 55.

Figure 4:
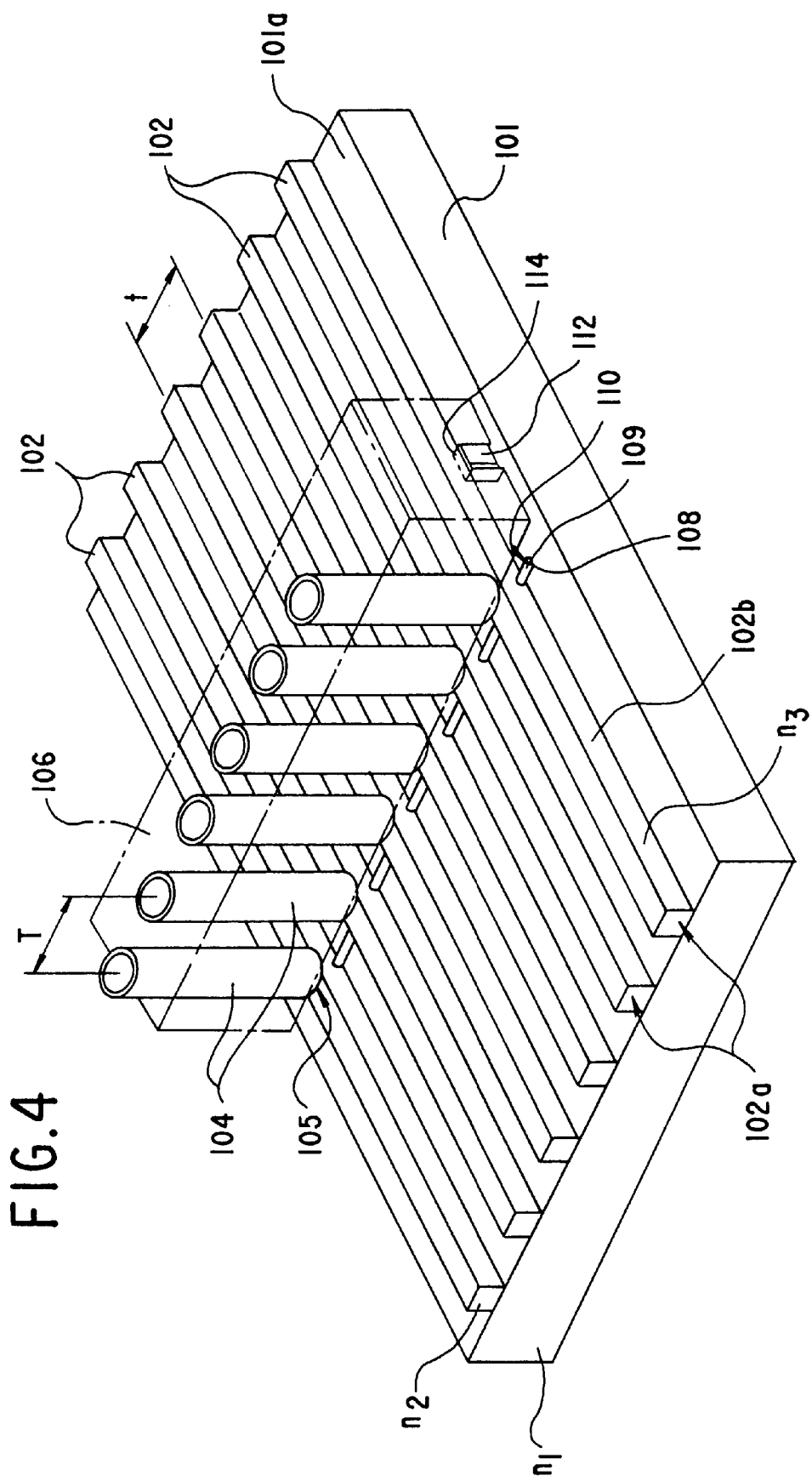
FIG. 4 is a perspective view of a branching optical wave guide array.

The branching optical wave guide configuration with many continuous optical wave guides shown in FIG. 4 is referred to as optical wave guide array. The continuous optical wave guides 102 may be formed directly on a substrate 101 by photostructuring and etching. Angularly branching optical wave guides 104, each with a coupling end face 105 facing toward the associated optical wave guide 102, are strategically disposed on the continuous optical wave guide 102. In a preferred embodiment, the branching optical wave guides 104 are received in a common optical array plug connector 106, such as a so-called MT ferrule. For purposes of clarity, the plug connector 106 is shown only phantom in FIG. 4. A continuous protrusion 108 is provided on the substrate 101. The protrusion 108 penetrates into each of the optical wave guides 102 from its respective jacket face and extends to the interior of the core 102a of the respective optical wave guide. As a result, the respective core region is narrowed laterally toward the protrusion, and as described at length above, this enables a partial beam transfer between the optical wave guides 102 and 104. To that end, in this example as well, the protrusion 108 has at least one side face 109, 110, which is located in the cross section of the continuous optical wave guides 102 and each forms the respective reflective face.

The proportion of the light which is allowed to pass relative to the light to be input can be varied by means of the size and shaping of the protrusion. The optical wave guides 104 are disposed at a pitch T (matrix spacing), which is equivalent to the pitch t of the continuous optical wave guides 102. In this way, an optical data bus with vertical beam branching can be attained within the tightest space. To simplify precise positioning of the plug connector 106 and hence of the end faces 105 with reference to the protrusion 108 or its reflective faces 109, 110, a mechanical alignment aid in the form of a prong 112 is formed on the substrate in an exact relative position with respect to the protrusion.

The prong 112 cooperates with a corresponding recess 114 in the plug connector.

The novel configuration can be produced in various ways. A particularly suitable and preferred mode of manufacture is so-called planar structuring, which is well known in semiconductor manufacturing technology. The dimensions and the tolerances of the system are thereby easily controlled. In a preferred embodiment, the substrate 101 is a plastic material, and the substrate surface 110a with the protrusion 108 and the alignment prong 112 can be structured by swaging (embossing). A plastic that has a low optical index of refraction $n_1$ is preferably chosen as the substrate 101. The region of the protrusion 108 may be selectively metallized as needed (see FIG. 5c). The substrate 101 is then coated with a second, optically conductive layer with a higher index of refraction $n_2$, and from that layer the optical wave guides 102 that are visible in FIG. 4 are formed by photostructuring and etching. If needed, these optical wave guides 102 can be coated with an outer layer with a low index of refraction $n_3$, which forms an optical wave guide jacket 102b.

An especially preferred use of the configuration shown in FIG. 4 is to make optical bus systems in optical backpanel connectors. To that end, a backpanel of an equipment cabinet can have the substrate 101 with the integrated coupling regions, and groups of components that can be inserted into the cabinet can have an optical array plug 106 on their end face toward the substrate, the plug containing the branching optical wave guide ends 104. By means of guide elements in the equipment, the array plug can be positioned precisely above the coupling regions when the component group is inserted, in order to assure a reliable optical connection between the component group and the optical backpanel.

Figure 5A:
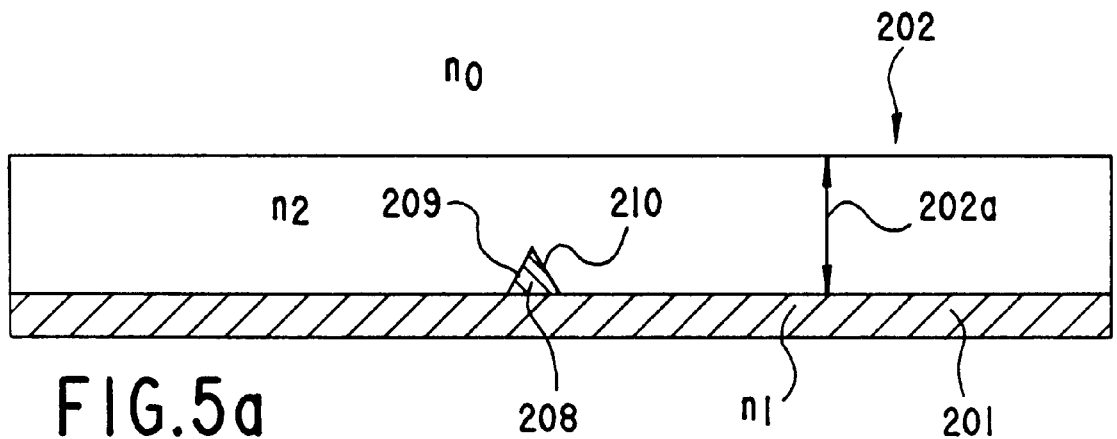
FIGS. 5a–5c are elevational, sectional views of three exemplary embodiments of reflective protrusions used in the wave guides according to the invention.
Figure 5B:
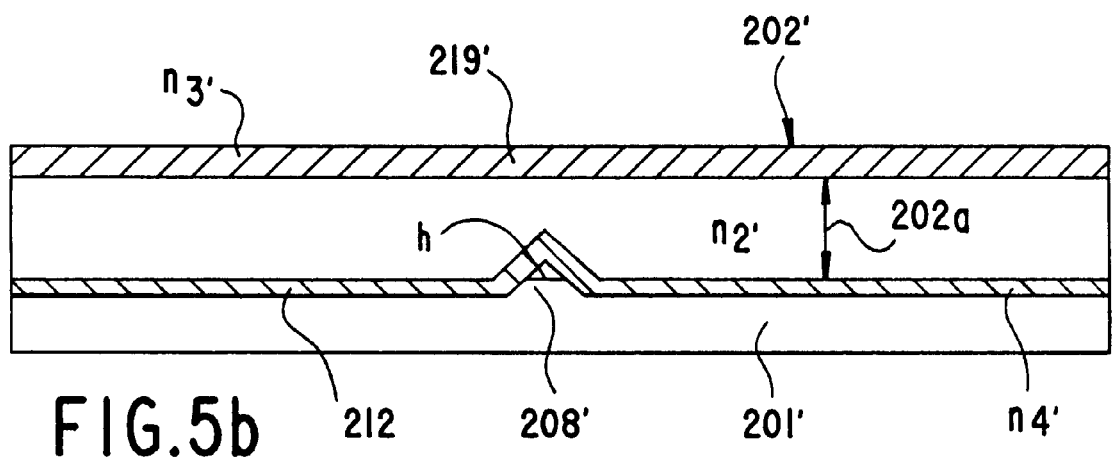
Figure 5C:
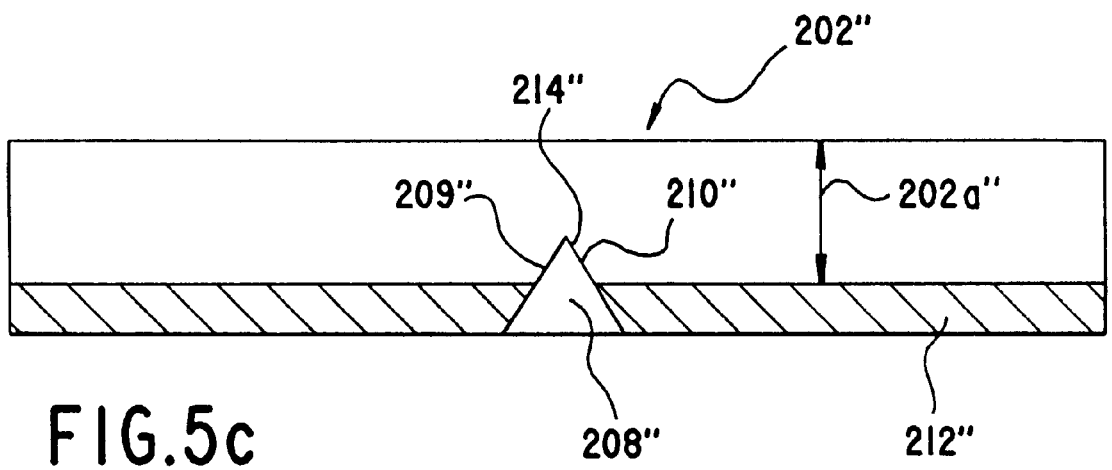

As illustrated by the exemplary embodiments of the continuous optical wave guide in FIGS. 5a–5c, the protrusions may be formed according to a variety of alternatives. Specifically, FIG. 5a shows a continuous optical wave guide 202 with a continuous light-guiding core region 202a. The optical wave guide 202 is formed on a substrate 201 that has a index of refraction $n_1$ and is formed with a protrusion 208. In FIG. 5a, the substrate 201, because of a suitable groove-like structuring, forms the bottom and side boundary (jacket) of the optical wave guide 202. The top of the optical wave guide 202 is adjacent to the ambient atmosphere (index of refraction $n_0$). The index of refraction $n_2$ of the core 202a is greater than the indices of refraction $n_0$ and $n_1$. The protrusion 208 formed by the substrate material penetrates into the core region 202a and with its smooth oblique faces 209, 210, as described at length above, it forms reflective faces for splitting the beam traveling in the core 202a into a branching optical wave guide which would be disposed just above the protrusion 208 but which is not illustrated in FIGS. 5a–5c for clarity (see FIGS. 1–4).

The variant of FIG. 5b includes a substrate 201' with a protrusion 208', which is initially provided with a jacket layer 212 before the core region material of the optical wave guide is mounted in order to form the light-guiding core 202a'. The core material is provided with a cover layer 219'. An index of refraction $n_3'$ of the cover layer 219' and an index of refraction $n_4'$ of the layer 212 are smaller than an index of refraction $n_2'$ of the core material. The protrusion 208' extends by a height h into the material of the core 202a' and with its oblique faces brings about the above-described beam deflection.

FIG. 5c describes a further variant, in which a protrusion 208" of a substrate, not shown in further detail, is mirror-coated beforehand by the application of a metal layer 214" to its side faces 209", 210". The protrusion 208" penetrates a jacket layer 212" on the bottom and projects into the fiber optical core region 202a" of the continuous optical wave guide 202".

I claim:

1. A branching optical wave guide configuration, comprising:

a substrate having a protrusion formed thereon;

a continuous optical wave guide with a light-guiding core disposed on said substrate;

a branching optical wave guide having a coupling end face disposed in a vicinity of and facing towards said continuous optical wave guide, said branching optical wave guide extending at an angle relative to said continuous optical wave guide;

said protrusion projecting into said light-guiding core of said continuous optical wave guide and defining at least one reflective face effecting a light transfer between said continuous optical wave guide and said branching optical wave guide.

2. The optical wave guide configuration according to claim 1, wherein the angle enclosed between said branching optical wave guide and said continuous optical wave guide is substantially 90°.

3. The optical wave guide configuration according to claim 1, wherein said continuous optical wave guide extends along a given direction, and wherein said protrusion has a prismatic cross section with two side faces extending transversely to the given direction of said continuous optical wave guide, said two side faces being inclined towards one another and each defining a reflective face of said protrusion.

4. The optical wave guide configuration of claim 1, wherein said branching optical wave guide is one of two mutually parallel branching optical wave guides, and wherein said continuous optical wave guide extends along a given direction, said protrusion having a trapezoidal cross section with two side faces which are inclined towards one another and a plateau formed between said side faces, said two side faces extending transversely to the given direction of said continuous optical wave guide and each of said side faces being aligned with a respective one of said branching optical wave guides.

5. The optical wave guide configuration according to claim 1, wherein said substrate is a plastic substrate.

6. A branching optical wave guide array, comprising:

a substrate formed with at least one protrusion;

a plurality of continuous optical wave guides, each formed with one light-guiding core, disposed on said substrate;

a plurality of branching optical wave guides extending at an angle relative to said continuous optical wave guides, each of said branching optical wave guides being formed with a respective coupling end face facing toward said continuous optical wave guides;

said protrusion penetrating into said light-guiding cores of said continuous optical wave guides, and being formed with at least one face within a cross section of said cores defining a reflective face in each of said continuous optical wave guides effecting a light signal transfer between said continuous optical wave guides and respective branching optical wave guides.

7. The optical wave guide array according to claim 6, which further comprises means disposed on said substrate and on said branching optical wave guides for exactly positioning said branching optical wave guides relative to said reflective faces.

8. The optical wave guide array according to claim 6, wherein said substrate is a plastic substrate.

* * * * *